(12) United States Patent
Legueux

(10) Patent No.: US 9,676,272 B2
(45) Date of Patent: Jun. 13, 2017

(54) INSTALLATION OF A UREA TANK IN A COMMERCIAL VEHICLE HAVING A DIESEL ENGINE AND CORRESPONDING VEHICLE

(71) Applicant: RENAULT s.a.s., Boulogne-Billancourt (FR)

(72) Inventor: Gilles Legueux, Beynes (FR)

(73) Assignee: RENAULT s.a.s., Boulogne-Billancourt (FR)

(*) Notice: Subject to any disclaimer, the term of this patent is extended or adjusted under 35 U.S.C. 154(b) by 135 days.

(21) Appl. No.: 14/430,963

(22) PCT Filed: Sep. 19, 2013

(86) PCT No.: PCT/FR2013/052164
§ 371 (c)(1),
(2) Date: Jun. 17, 2015

(87) PCT Pub. No.: WO2014/049237
PCT Pub. Date: Apr. 3, 2014

(65) Prior Publication Data
US 2016/0031313 A1    Feb. 4, 2016

(30) Foreign Application Priority Data
Sep. 25, 2012 (FR) ..................... 12 59007

(51) Int. Cl.
*B60K 13/04* (2006.01)
*B60K 15/04* (2006.01)
(Continued)

(52) U.S. Cl.
CPC ...... *B60K 13/04* (2013.01); *B60K 2015/0474* (2013.01); *B60R 17/00* (2013.01);
(Continued)

(58) Field of Classification Search
CPC ........ B60K 13/04; B60K 15/00; B60K 15/01; B60K 15/03; B60K 15/063; B60K 15/05;
(Continued)

(56) References Cited

U.S. PATENT DOCUMENTS 6,223,526 B1 * 5/2001 Wissler ................. B60K 15/03
220/23.87
8,167,009 B2 * 5/2012 Vandervoort ...... B60K 15/0406
123/1 A
(Continued)

FOREIGN PATENT DOCUMENTS

EP    1 659 051    5/2006
EP    2 431 536    3/2012

OTHER PUBLICATIONS

French Search Report Issued May 13, 2013 in French Patent Application No. 1259007 Filed Sep. 25, 2012.
(Continued)

*Primary Examiner* — James M Dolak
(74) *Attorney, Agent, or Firm* — Oblon, McClelland, Maier & Neustadt, L.L.P.

(57) ABSTRACT

A commercial vehicle including a diesel engine, a lower vehicle structure defining a vehicle floor, and, to a side, a running board providing access to a front seat of the vehicle, the lower structure supporting, under the floor, a gas oil tank including a filling pipe leading to the side of the vehicle, in a rear of the running board. The vehicle further includes a urea tank housed in immediate vicinity of the gas oil tank, and includes a filling pipe which leads into a rear front wall of the running board at a housing formed in the front wall of the running board and closable by a trap.

7 Claims, 4 Drawing Sheets

(51) Int. Cl.
*B60R 17/00* (2006.01)
*F01N 3/20* (2006.01)
(52) U.S. Cl.
CPC ....... *B60Y 2200/141* (2013.01); *F01N 3/2066* (2013.01); *F01N 2610/1406* (2013.01)
(58) Field of Classification Search
CPC .... B60K 15/067; B60K 15/07; B60K 15/073; B60K 2015/0474; B60K 2015/03019; B60K 2015/0467; B60K 2015/0461; B60K 2015/0458; F01N 2610/1406; F01N 2610/02; F01N 2610/14; F01N 2610/1413
See application file for complete search history.

(56) References Cited

U.S. PATENT DOCUMENTS

| | | | | |
|---|---|---|---|---|
| 8,490,821 B2 * | 7/2013 | Tam | ...................... | B60K 15/03 220/4.01 |
| 8,495,960 B2 * | 7/2013 | Willbrandt | ................ | B61C 5/04 105/62.1 |
| 8,661,793 B2 * | 3/2014 | Yamashita | ............. | B60K 13/04 60/286 |
| 8,695,827 B2 * | 4/2014 | Klauer | ................... | B60K 13/04 141/369 |
| 8,708,087 B2 * | 4/2014 | Kashu | ................... | B60K 13/04 180/291 |
| 9,267,268 B2 * | 2/2016 | Arai | ..................... | B60K 15/063 |
| 9,453,327 B2 * | 9/2016 | Okamoto | ............. | E02F 9/0883 |
| 9,487,078 B2 * | 11/2016 | Kamimae | ............. | B60K 11/08 |
| 2009/0145903 A1 | 6/2009 | Soltis et al. | | |
| 2011/0017537 A1 * | 1/2011 | Andou | ................ | B60K 15/063 180/89.16 |
| 2012/0067660 A1 | 3/2012 | Kashu et al. | | |
| 2013/0071295 A1 * | 3/2013 | Terakawa | ................... | E02F 9/0858 422/168 |

OTHER PUBLICATIONS

International Search Report Issued Dec. 6, 2013 in PCT/FR2013/052164 Filed Sep. 19, 2013.

* cited by examiner

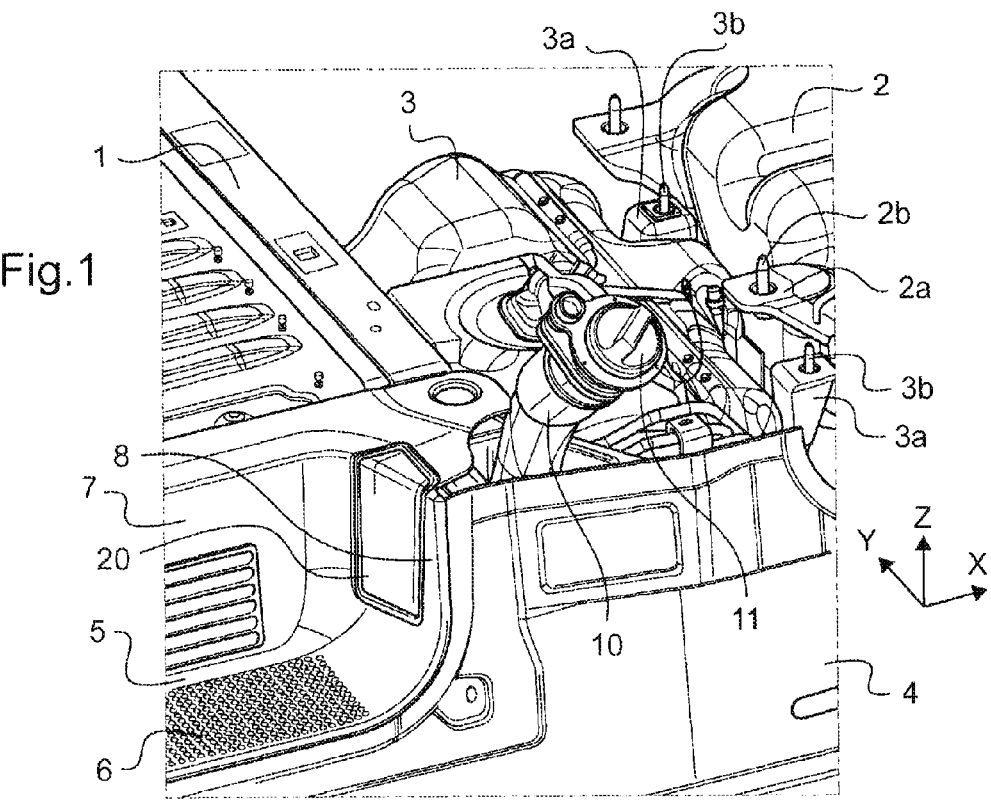
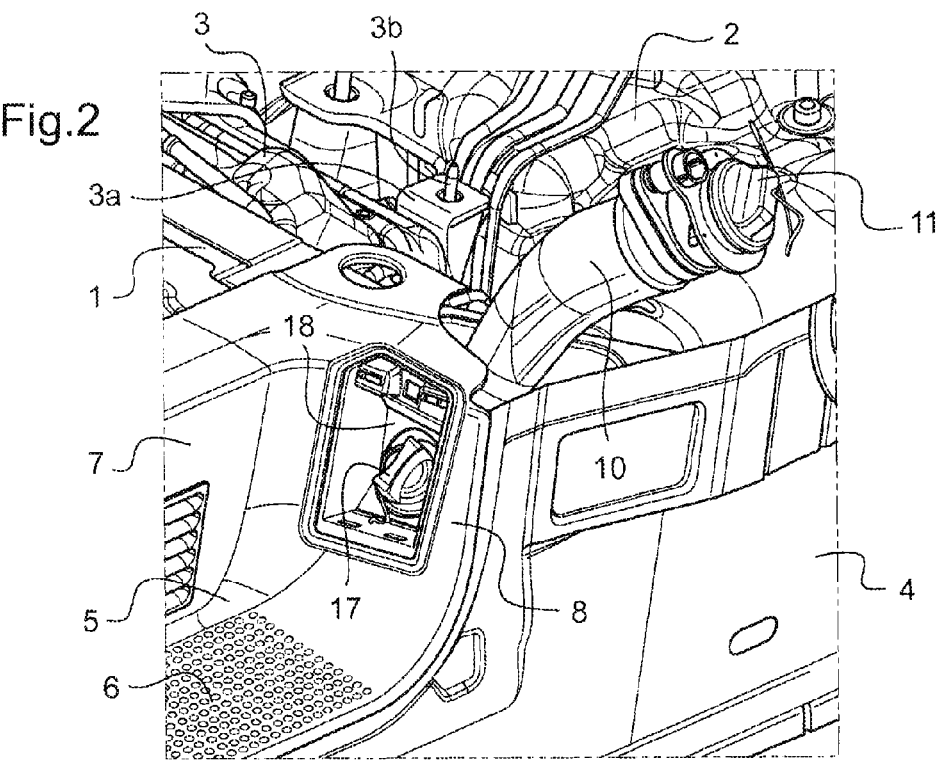

INSTALLATION OF A UREA TANK IN A COMMERCIAL VEHICLE HAVING A DIESEL ENGINE AND CORRESPONDING VEHICLE

BACKGROUND

The present invention relates to the installation of a urea tank pipe in a commercial vehicle with a diesel engine.

Document FR 2936982 discloses the advantages of urea injection in the exhaust line of a vehicle with a diesel engine, with the aim of reducing harmful emissions. Moreover, document U.S. 2009/0188923 discloses a type of urea tank installed in a motor vehicle. The anticipated spread of this device raises problems for vehicle manufacturers when it comes to installing the tank and providing for the filler pipe thereof in the most suitable manner possible. This is the problem that the invention aims to solve within the framework of a commercial vehicle.

BRIEF SUMMARY

The invention achieves its objective thanks to the installation of a tank pipe in a commercial vehicle with a diesel engine of the type comprising a lower vehicle structure defining a vehicle floor and, to the side, a running board providing access to a front seat or to the cargo space of the vehicle, the lower structure supporting beneath the floor a diesel oil tank fitted with a filler pipe opening out at the side of the vehicle, at the rear or at the front of the running board, the vehicle moreover comprising a urea tank fitted with a filler pipe, characterized in that the urea tank is housed in the immediate vicinity of the diesel oil tank and in that the filler pipe opens out in a front wall of the running board. Very advantageously, the filler pipe opens out in a front wall to the rear of the running board providing access to a front seat of the vehicle.

In this way, access to the filler pipe is easy for the user and secured along with the car, since this front wall of the running board is covered by the closed front door of the vehicle during normal use.

The filler pipe advantageously opens out at the level of a housing formed in the front wall of the running board.

The housing is advantageously closed by a removable panel which can be opened by the user.

The invention also relates to a motor vehicle comprising a tank pipe, a lower vehicle structure defining a vehicle floor and, to the side, a running board providing access to a front seat or to the cargo space of the vehicle, the lower structure supporting beneath the floor a diesel oil tank fitted with a filler pipe opening out at the side of the vehicle, at the rear or at the front of the running board, the vehicle moreover comprising a urea tank provided with a filler pipe, characterized in that the urea tank is housed in the immediate vicinity of the diesel oil tank and in that the filler pipe opens out in a front wall of the running board. The vehicle advantageously comprises a door, particularly a front door, capable of covering the front wall of the running board when it is in the closed position, so as to prevent access to the filler pipe in this position.

BRIEF DESCRIPTION OF THE DRAWINGS

Other characteristics and advantages of the invention will emerge from the following description of an exemplary embodiment. Reference will be made to the attached drawings in which:

FIG. 1 is a perspective view of a detail of the vehicle in the invention, in the installation region of the filler pipe of the urea tank, at the level of the running board providing access to the front seat, FIG. 2 is a corresponding view to FIG. 1 from a slightly different angle, the access panel to the filler pipe being removed.

DETAILED DESCRIPTION

The description refers to the orientation of the trihedron XYZ referred to (FIG. 1):
X=longitudinal direction of the vehicle, pointing towards the rear
Y=crosswise to the vehicle, pointing towards the right of the vehicle
Z=vertical, pointing upwards.

Figure 3:
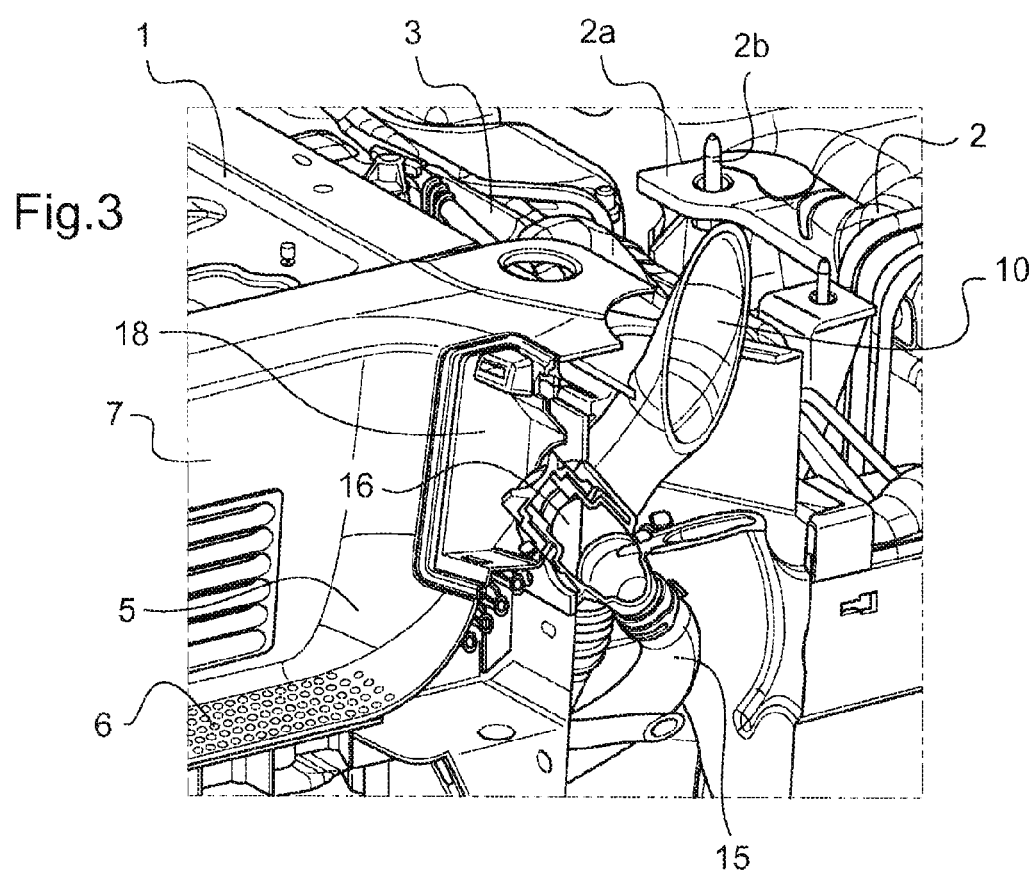
FIG. 3 is a similar view with a section in a vertical longitudinal plane passing through the filler pipe.
Figure 5:
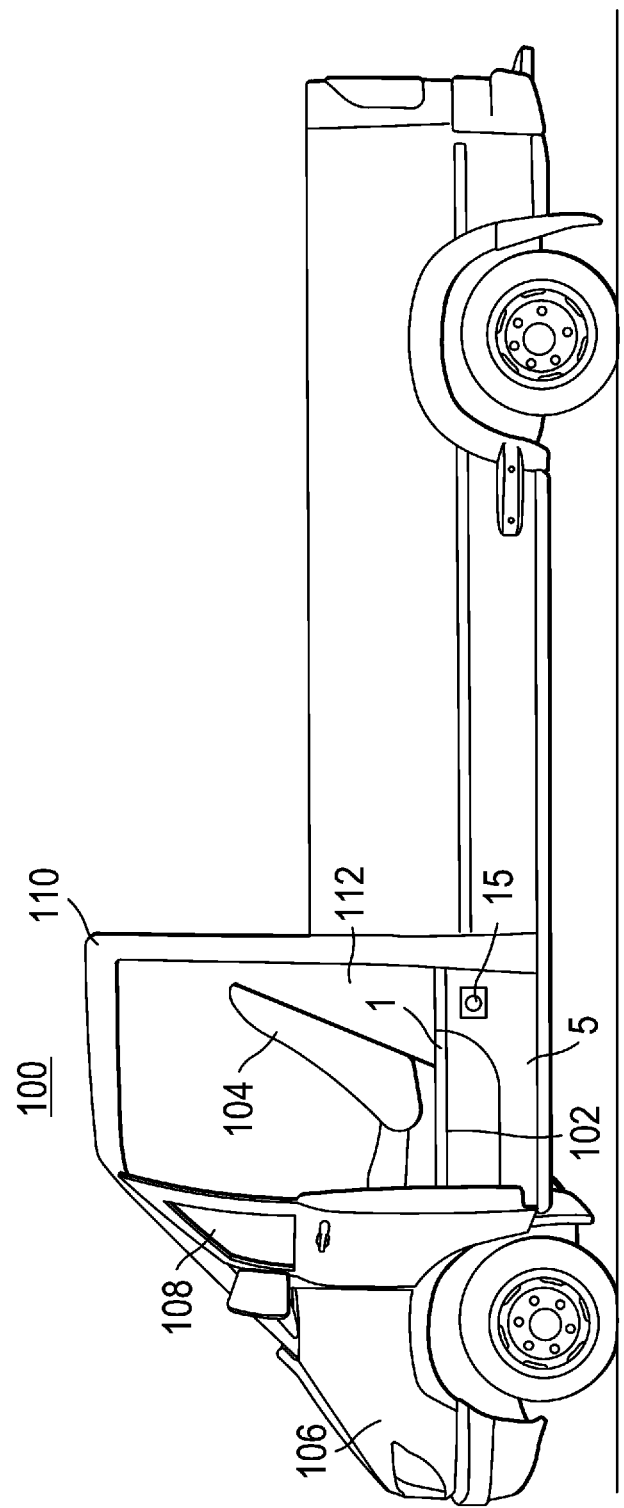
FIG. 5 is a view of the motor vehicle with the door in an open position.

The industrial vehicle 100 only a small part of which is shown in FIGS. 1-3, comprises a diesel engine 106 and a chassis with a lower structure 102 on which a horizontal floor 1 rests. FIGS. 1-3 only show the front portion of the floor 1 at the level of the front seats (104 in FIG. 5) of the vehicle. The floor continues to a cargo space (112 in FIG. 5) the rear but has not been depicted in FIGS. 1-3, in order to show the diesel oil tank 2 which is installed beneath the floor 1 and fixed to the structure (a horizontal crosspiece, for example) by known means, for example limbs 2a and screws 2b (a single limb and a single screw are shown). The side of the vehicle is surrounded by a side body sheet 4 fixed to the chassis, only one portion whereof is represented in the figures. The threshold of the side opening providing access to the front seat comprises a miming board trim 5 fixed to the chassis and a non-slip step 6, a vertical riser 7 and front walls at the front (not shown) and rear 8 rising substantially vertically at the front and at the rear of the step 6. The diesel oil tank 2 opens up to the outside through a filler pipe 10 fitted with a cap 11 at the level of a panel provided in the side body 4, typically situated on the middle foot separating a front door from a rear side door. The panel is fitted with a safety closing device. All these elements are known per se and do not need to be described further.

Figure 4:
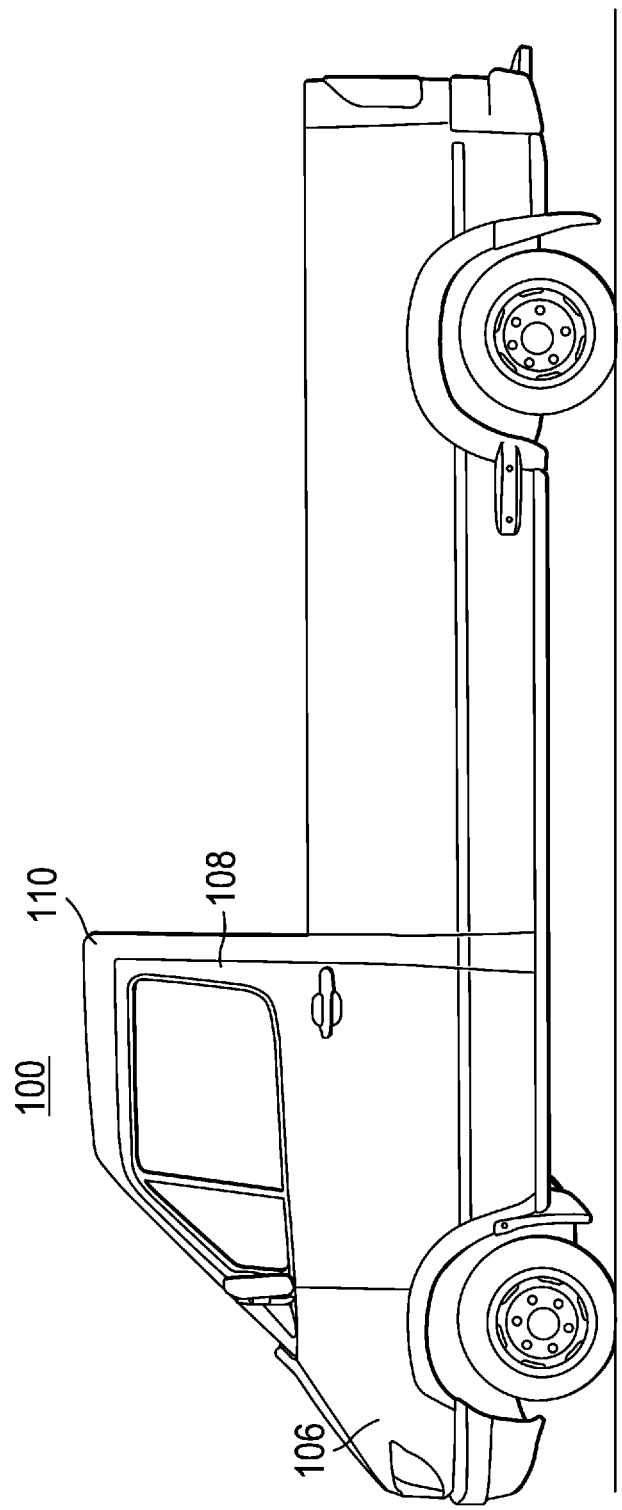
FIG. 4 is a view of the motor vehicle with the door in a closed position.

According to the typical installation of the invention, a urea tank 3 has been envisaged located below the floor 1 alongside the diesel oil tank 2 in the longitudinal direction Y of the vehicle. It is fixed to the structure by means that are likewise known such as, for example, limbs 3a and screws 3b. The urea tank 3 can be filled thanks to a filler pipe 15, the upper opening 16 whereof can be closed by a cap 17 and is situated in a housing 18 formed in the front vertical wall at the rear 8. The housing 18 can be accessed by a removable panel 20 (FIG. 1). The panel does not need to be made secure because it is situated in the running board 5 which is covered by the side door 108 of the vehicle 100 when said door is closed, as shown in FIG. 4. This door is typically a front door. The pipe 15 connects the opening 16 to the urea tank 3 by a conduit which is not shown.

The user therefore has easy access to the urea filler pipe situated in the cab 110; he removes the panel 20, unscrews the cap 17 and proceeds with the filling process using a specific bottle which screws on and prevents overflowing. This operation should be carried out every 30,000 kilometers or thereabouts.

In another embodiment which is not illustrated, the filler pipe opens out in a front wall at the front of a running board corresponding to a side door at the rear of the vehicle, for example a sliding side door. In the closed position, the sliding side door likewise covers the front wall at the front, preventing access to the filler pipe.

The invention claimed is:

1. A tank pipe installation in a commercial vehicle with a diesel engine, comprising:
   a lower vehicle structure defining a vehicle floor and, to a side, a running board providing access to a front seat or to a cargo space within a cab of the vehicle, the cab being closed off from outside of the vehicle by a door, the lower structure supporting beneath the floor a diesel oil tank including a filler pipe opening out at a side of the vehicle, at a rear, or at a front of the running board;
   the vehicle further comprising a urea tank including a filler pipe, wherein the urea tank is provided in a housing in an immediate vicinity of the diesel oil tank and the filler pipe opens out in a front wall of the running board behind the door such that when the door is in a closed position access to the filler pipe of the urea tank is prevented by the door.

2. The installation as claimed in claim 1, wherein the filler pipe of the urea tank opens out in the front wall at the rear of the running board.

3. The installation as claimed in claim 1, wherein the housing is closed by a panel that can be opened by a user.

4. A motor vehicle comprising:
   a cab including a lower vehicle structure defining a vehicle floor and, to a side, a running board providing access to a front seat or to a cargo space within the cab of the vehicle, the cab being closed off from outside of the vehicle by a door, the lower structure supporting beneath the floor a diesel oil tank including a filler pipe opening out at a side of the vehicle, at a rear, or at a front of the running board;
   a urea tank including a filler pipe, wherein the urea tank is provided in a housing in an immediate vicinity of the diesel oil tank and the filler pipe of the urea tank opens out in a front wall of the running board behind the door such that when the door is in a closed position access to the filler pipe of the urea tank is prevented by the door.

5. The installation as claimed in claim 1, wherein the door is a front door of the vehicle.

6. The motor vehicle as claimed in claim 4, wherein the door is a front door of the vehicle.

7. The motor vehicle as claimed in claim 4, wherein the housing is closed by a panel that can be opened by a user.

* * * * *